United States Patent
Zhang et al.

(10) Patent No.: US 11,847,811 B1
(45) Date of Patent: Dec. 19, 2023

(54) IMAGE SEGMENTATION METHOD COMBINED WITH SUPERPIXEL AND MULTI-SCALE HIERARCHICAL FEATURE RECOGNITION

(71) Applicant: NANJING UNIVERSITY OF POSTS AND TELECOMMUNICATIONS, Nanjing (CN)

(72) Inventors: Dengyin Zhang, Nanjing (CN); Wenye Ni, Nanjing (CN); Xiaofei Jin, Nanjing (CN); Qunjian Du, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 18/151,909

(22) Filed: Jan. 9, 2023

Related U.S. Application Data

(63) Continuation of application No. PCT/CN2022/135319, filed on Nov. 30, 2022.

(30) Foreign Application Priority Data

Jul. 26, 2022 (CN) .......................... 202210886251.9

(51) Int. Cl.
*G06V 10/26* (2022.01)
*G06V 10/77* (2022.01)
(Continued)

(52) U.S. Cl.
CPC ............ *G06V 10/267* (2022.01); *G06V 10/28* (2022.01); *G06V 10/54* (2022.01); *G06V 10/56* (2022.01);
(Continued)

(58) Field of Classification Search
CPC .. G06V 10/267; G06V 10/56; G06V 10/7715; G06V 10/54; G06V 10/82; G06V 10/28; G06V 10/764
See application file for complete search history.

(56) References Cited

U.S. PATENT DOCUMENTS 6,324,532 B1 * 11/2001 Spence ............. G06F 18/24155
706/19
10,007,865 B1 * 6/2018 Kim ....................... G06V 20/00
(Continued)

FOREIGN PATENT DOCUMENTS

| CN | 109325507 A | 2/2019 |
| CN | 110443195 A | 11/2019 |

(Continued)

OTHER PUBLICATIONS

Díaz-Pernas, Francisco Javier, et al. "A deep learning approach for brain tumor classification and segmentation using a multiscale convolutional neural network." Healthcare. vol. 9. No. 2. MDPI, 2021. (Year: 2021).*

(Continued)

*Primary Examiner* — Utpal D Shah
(74) *Attorney, Agent, or Firm* — Nitin Kaushik

(57) ABSTRACT

The present disclosure discloses an image segmentation method combined with superpixel and multi-scale hierarchical feature recognition. This method is based on a convolutional neural network model taking multi-scale hierarchical features extracted from a Gaussian pyramid of an image as a recognition basis, and then being connected with a multilayer perceptron to achieve the recognition of each pixel in the image, moreover, this method is used tier performing superpixel segmentation on the image and is combined with a method for improving superpxiel in combination with LBP texture features to segment an original image so that an obtained superpixel block is more fitted to (Continued)

edges of targets, then, the original image is merged according to a mean value of a color, and finally, recognition of each target in the image is achieved.

10 Claims, 3 Drawing Sheets

(51) Int. Cl.
  *G06V 10/82* (2022.01)
  *G06V 10/28* (2022.01)
  *G06V 10/56* (2022.01)
  *G06V 10/764* (2022.01)
  *G06V 10/54* (2022.01)

(52) U.S. Cl.
  CPC ........ *G06V 10/764* (2022.01); *G06V 10/7715* (2022.01); *G06V 10/82* (2022.01)

(56) References Cited

U.S. PATENT DOCUMENTS

| | | | | |
|---|---|---|---|---|
| 11,488,283 | B1* | 11/2022 | Liu | G06T 7/55 |
| 11,645,835 | B2* | 5/2023 | Greenblatt | G06V 10/803 |
| | | | | 706/15 |
| 2015/0235073 | A1* | 8/2015 | Hua | G06V 10/764 |
| | | | | 382/118 |
| 2018/0253622 | A1 | 9/2018 | Chen et al. | |
| 2020/0160997 | A1* | 5/2020 | Bagci | A61B 6/037 |
| 2023/0039592 | A1* | 2/2023 | Chan | G06T 7/246 |
| 2023/0102467 | A1* | 3/2023 | He | G06V 10/764 |
| | | | | 382/103 |
| 2023/0252761 | A1* | 8/2023 | Du | G01J 3/2823 |
| | | | | 382/224 |

FOREIGN PATENT DOCUMENTS

| | | |
|---|---|---|
| CN | 110706234 A | 1/2020 |
| CN | 113240688 A | 8/2021 |
| CN | 113920442 A | 1/2022 |
| CN | 114494696 A | 5/2022 |
| CN | 115170805 A | 10/2022 |
| WO | WO2021188477 A1 | 9/2021 |

OTHER PUBLICATIONS

Yin, Bei, and Binge Cui. "Multi-feature extraction method based on Gaussian pyramid and weighted voting for hyperspectral image classification." 2021 IEEE International Conference on Consumer Electronics and Computer Engineering (ICCECE). IEEE, 2021. (Year: 2021).*

* cited by examiner

IMAGE SEGMENTATION METHOD COMBINED WITH SUPERPIXEL AND MULTI-SCALE HIERARCHICAL FEATURE RECOGNITION

CROSS-REFERENCE TO RELATED APPLICATIONS

The application claims priority to Chinese patent application No. 202210886251.9, filed on Jul. 26, 2022, the, entire contents of which are incorporated herein by reference.

TECHNICAL FIELD

The present disclosure relates to an image segmentation method combined with superpixel and multi-scale hierarchical feature recognition, and belongs to the technical field of image processing.

BACKGROUND

Image recognition is achieved by template matching and is evolved from human visual recognition. A human visual recognition method is to compare a target object in front of a person with a content remembered in the mind and finally define the target object in front of the person. Image recognition is also based on the same principle, i.e., firstly, corresponding features are extracted from an original image; then, the features are compared with target features; and finally, a recognition function is achieved. In modern science and technology, image recognition plays a vital role in fields such as unmanned driving, face recognition and missile tracking which are all closely related to image recognition. With the continuous progress of the times and the continuous development of science and technology, image recognition technology has been developed faster and faster, and so far, it mainly includes statistical recognition, fuzzy set recognition, neural network recognition, template matching recognition, structure recognition, support vector machine recognition, etc. Furthermore, there is further a method for auxiliary recognition by utilizing a target under a certain special condition.

Nowadays, almost all image recognition technologies are inseparable from steps such as image preprocessing, image separation, feature extraction and feature matching recognition. By image segmentation, a lot of computing resources are saved, and an image is segmented into different regions according to some parameters so that effective regions are extracted therefrom. Each of segmentation methods based on threshold, region and cluster analysis and methods for segmenting an image by introducing superpixel is an image segmentation method which is commonly used now.

Image segmentation is an important link in image recognition and is a premise of image understanding and analysis. If a reasonable and effective segmentation method is selected according to different use scenarios, the time for image recognition can be greatly shortened, and then, a lot of computing resources are saved. For example, in the field of automatic driving, important traffic information such as lane driving lines, traffic signs and traffic lights at intersections can be quickly and accurately recognized by image segmentation. Thus, it can be seen that image segmentation is in a very important position.

With the continuous development of research in fields relevant to image segmentation in recent years, many perfect image segmentation technologies have emerged. Image segmentation means that pixels with similar characteristics in an image are divided into a category, so that each category has a different semantic. Image segmentation methods can be roughly divided into two categories: traditional unsupervised methods and supervised deep learning methods.

Traditional image segmentation methods are mainly divided into five categories that are respectively a threshold-based image segmentation method, an edge-based image segmentation method, a graph-based image segmentation method, a cluster-based image segmentation method and a region-based image segmentation method.

The threshold-based image segmentation method is a classical segmentation method. By setting a threshold, a gray histogram of an image is classified, its essence is divided an image into target objects and backgrounds by selecting a threshold according to the consistency of grays within a region and the diversity of grays among regions. This method is relatively simple to implement, but often shows relatively poor results for relatively complex image segmentation tasks.

The edge-based image segmentation method is to segment an image by detecting an edge of the image, and it is usually to obtain edge points of the image according to the characteristics of different gray values of pixels in different regions and relatively great changes of the gray values of the pixels in a region boundary, and then, connect all the edge points to firm a segmentation region, however, it may result in an insufficient segmentation result for, a generated unclosed boundary. The graph-based image segmentation method is to convert an image segmentation problem into a graph division problem, map the image to a weighted undirected graph, and then divide the graph into a plurality of categories by minimizing a given cost function, however, it is large in amount of calculation and complex in algorithm. The cluster-based image segmentation method is to gather similar pixel points into a category and perform repeated iteration until a result is converged, but it needs to set the number of clusters in advance.

The region-based image segmentation method is divided into a region growing method and a region splitting and merging method. The region growing method is to select a group of seed points as a starting point of growth, and merge, according to growth criteria, pixel points close to the seed points and similar to the seed points into a pixel region where the seed points are located to achieve the growth and extension of the region. The region splitting and merging method is to split an image into regions with different characteristics according to similarity criteria, then, merge the regions with the same characteristics, and repeat the operation until no splitting and merging occur. The region segmentation method can obviously reduce the interference from noise and has stronger robustness. For a supervised deep learning image segmentation method, with the development of deep learning, researchers in the field of computers have gradually used a convolutional neural network as the main means fir image processing, which can make full use of deep feature information of the image to complete an image segmentation task.

SUMMARY

The objective of the present disclosure is to provide an image segmentation method combined with superpixel and multi-scale hierarchical feature recognition to solve the problems in an image segmentation method based on a convolutional neural network structure in the prior art that data sets need to be normalized, images with different sizes are mixed together to be difficult to train, and pixels, located on overlapping edges, of an image may be misjudged due to the lack of artificial division for targets in the image during early image preprocessing.

Technical solutions: for solving the above-mentioned technical problems, the so present disclosure adopts the technical solutions:

disclosed is an image segmentation method combined with superpixel and multi-scale hierarchical feature recognition, including:

inputting a to-be-segmented image into a preconstructed multi-scale Gaussian pyramid to perform extracted multi-scale hierarchical feature recognition to obtain a plurality of multi-scale images;

inputting the plurality of multi-scale images into a pre-trained multi-scale convolutional neural network to generate feature images, sampling the feature images, and combining the images with same scales together to generate a multi-scale hierarchical feature matrix;

implementing by the multi-scale hierarchical feature matrix, image pixel category distribution on the to-be-segmented image of the multi-scale hierarchical feature matrix by virtue of a multilayer perceptron;

segmenting, by adopting superpixel improved in combination with LBP texture features, the to-be-segmented image subjected to the image pixel category distribution, and merging the to-be-segmented image according to a mean value of a color to achieve recognition and segmentation of targets in the image.

Further, a construction method for the multi-scale Gaussian pyramid comprises:

after Gaussian is performed on a first layer of a first group of an original image, taking the first layer as a second layer of a first group of pyramid, wherein a two-dimensional Gaussian convolution function corresponding to a pixel position (x, y) on the image is expressed as:

$$G(x, y, \sigma) = \frac{1}{2\pi\sigma^2} e^{-\frac{(x-\frac{m}{2})^2+(y-\frac{n}{2})^2}{2\sigma^2}}$$

wherein is σ scale space factor, the larger the value of σ is, the smoother the image is; m and n are dimensions of a Gaussian matrix; and M and N are dimensions of a two-dimensional image;

setting a scale space L(x, y, σ) of the image to be a convolution of a variable-scale Gaussian function G(x, y, σ) and an original image I(x, y), L(x, y, σ)=G(x, y, σ)*I(x, y); then, obtaining an image of a $L^{th}$ layer of each group, wherein the area of the image of each group is 1/2 of the area of an image of a previous group; and repeatedly performing the operation to obtain O*L images in total comprising O groups in total with each group having L layers, thereby constructing a multi-scale Gaussian pyramid SIFT.

Further, the multi-scale convolutional neural network comprises three same CNN structural networks, each of the CNN structural network consists of three stages, each of a first stage and a second stage consists of a filter bank, a nonlinear activation function tanh and a pooling operation, and a third stage consists of a filter bank.

Further, the filter bank at the first stage comprises 16 convolution kernels, wherein of the convolution kernels are connected to a channel Y for inputting the image, other 8 convolution kernels are connected to channels U and V, and the original image is converted into 16-dimensional feature images; the filter bank at the second stage is connected to the maximum pooling operation result at the first stage, wherein the filter bank comprises 64 convolution kernels, each convolution kernel is connected to any 8 feature images, and the 16-dimensional feature images at the previous stage are converted into 64-dimensional feature images; and the filter bank at the third stage is connected to the maximum pooling operation result at the second stage, wherein the filter hank comprises 256 convolution kernels, each convolution kernel is connected to any 32 feature images, and the 64-dimensional feature images at the previous stage are converted into 256-dimensional feature images.

Further, the size of each convolution kernel of each filter bank is 7×7, and the pooling operation is performed by adopting a 2×2 maximum pooling method, Further, the, multi-scale convolutional neural network is set as $f_n$ and an internal parameter thereof is set as $\theta_n$, the multi-scale convolutional neural network consists of a convolutional neural network model of each image with a corresponding scale, a parameter of each model is $\theta_n$, i.e., $\theta_n=\theta_0$, n ∈ {1, 2, ..., N}, wherein $\theta_0$ is an initial parameter of the model, in the existance of a convolutional neural network model with a scale n, for the multi-scale convolutional neural network $f_n$ having S stages, $$f_n(X_n;\theta_n)=W_S H_{S-1};$$

wherein $W_S$ is a weight matrix of a $S_{th}$ stage, $H_{S-1}$ is an output of a S-$1_{th}$ stage, and $H_0=X_n$.

Further, the multi-scale hierarchical feature matrix, satisfies a formula:

$$F=[f_1, \mu(f_2), ..., \mu(f_N)],$$

wherein μ is an upsampling function.

Further, the image pixel category distribution comprises:

adding a linear classifier into a multi-scale convolutional neural network model to learn multi-scale hierarchical features, thereby generating a correct classification prediction for each pixel target in the image;

setting $J_i$ as a standardized prediction vector for a category to which a pixel i belongs; and in order to calculate a loss function, utilizing a softmax function to calculate a standardized prediction probability distribution $\tilde{f}_{i,a}$ that the pixel i belongs to a category a, $$\tilde{f}_{i,a} = \frac{e^{w_a^T F_i}}{\sum_{b \in classes} e^{w_b^T F_i}}$$

wherein W is a temporary weight matrix only for learning features, and $F_i$ represents a multi-scale hierarchical feature expression vector corresponding to a position where the pixel i is located.

Further, the superpixel segmentation adopts an improvement method based on LBP texture features, and this method is specifically implemented as follows:

initializing seed points, Uniformly distributing the seed points in the image according to a set number of the superpixel, setting the image to have N pixel points in total, presegmenting the pixel points into K superpixel with the same sizes, with each superpixel having a size N/K and a distance between the adjacent seed points, i.e., a step length being S=$\sqrt{N/K}$, calculating a center of the seed points according to $$C_k=[l_k, a_k, b_k, x_k, y_k]^T;$$

measuring a distance, distributing a category label for each pixel point within a neighborhood surrounding: each seed point, performing search within a range 25×25 by adopting a Euclidean distance measurement method, and then, calculating, a distance D between each seed point in a clustering center and each pixel point within the range 25×25 according to:

$$d_{lab} = \sqrt{(l_k - l_i)^2 + (a_k - a_i)^2 + (b_k - b_i)^2}$$

$$d_{xy} = \sqrt{(x_k - x_i)^2 + (y_k - y_i)^2}$$

$$D = d_{lab} + \frac{m}{s}d_{xy};$$

wherein $d_{lab}$ is a color distance, $d_{xy}$ is a spatial distance, m is a weight coefficient for adjusting the spatial distance, S is a distance among the seed points, and therefore, the smaller the value of D is, the higher the similarity among the pixels is;

further performing iterative optimization, and updating the center of the seed points until errors are converged; and enhancing connectivity, and distributing the superpixel according to a "Z"-shaped tendency.

Further, the superpixel segmentation method comprises:

comparing gray values of pixel points in the neighborhood thereof with a threshold by adopting a LBP algorithm to obtain binary codes for expressing local texture features, wherein a LBP value is calculated according to a formula:

$$LBP_{i_c} = \sum_{p=0}^{p-1} 2^p s(i_p - i_c)$$

wherein $i_c$ a gray value of a pixel point in the center, $i_p$ is a gray value of each pixel point in the neighborhood, and s is a sign function, $$S(x) = \begin{cases} 1, x \geq 0 \\ 0, x < 0 \end{cases}$$

introducing the LBP texture features to an SLIC algorithm, adding the LBP value when the seed points are initialized by using an improved SLIC algorithm, i.e., $$C_k = [l_k, a_k, b_k, x_k, y_k, LBP_k]^T$$

adding a texture distance in the step of measuring the distance, i.e., $$d_{LBP} = \sqrt{(LBP_k - LBP_i)^2}$$

$$D = d_{lab} + \frac{m}{S}d_{xy} + \frac{n}{S}d_{LBP}$$

wherein n is a weight coefficient for adjusting the texture distance; and finally, merging regions where color features are similar to achieve segmentation of the image.

Compared with the prior art, the present disclosure achieves the beneficial effects that, by using the method in combination with superpixel in the present disclosure, accurate over-segmentation for edges of targets of an image can be achieved, before the image is segmented, firstly, the image is preprocessed and is partially enhanced, so that the targets of the image become more apparent, then, it is easier to distinguish the targets of the image from a background; next, when superpixel segmentation is performed on the image, the LBP texture features are added by virtue of influences of the LBP texture features on image segmentation, and thus, the generated superpixel block can be more fitted to the edges of the targets; then, merging regions where color features are similar; and finally, the image is segmented. By using this method, a result of an image can be completely and accurately extracted, the problem that pixels, located on overlapping edges, of an image may be misjudged can be solved, and requirements on image preprocessing are also reduced.

DETAILED DESCRIPTION OF THE EMBODIMENTS

In order to easily understand and know about technical means for implementing the present disclosure, creation features as veil as achieved objectives and effects, the present disclosure will be further described below in conjunction with specific implementations.

Figure 1:
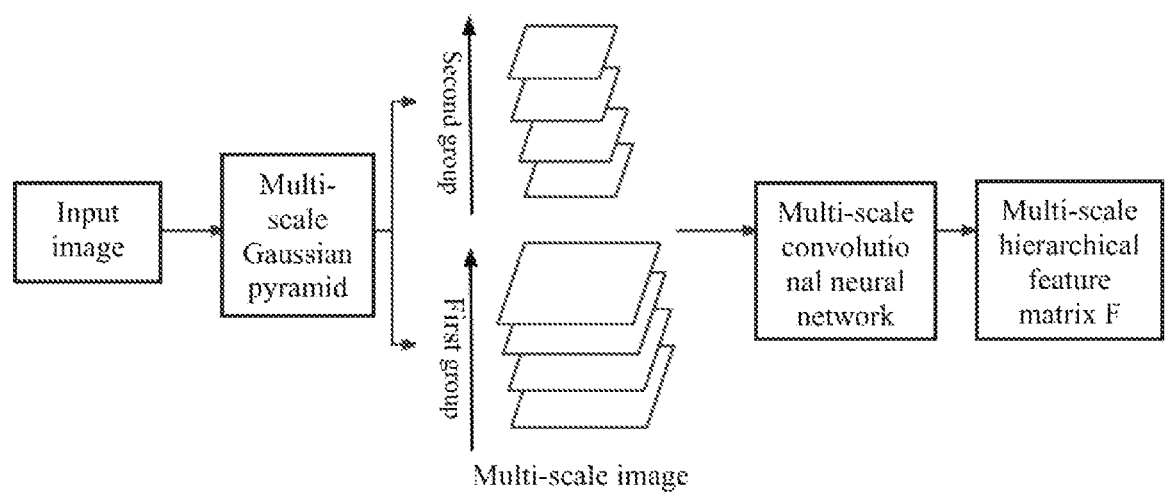
FIG. 1 is a schematic view showing an overall structure for multi-scale hierarchical feature extraction in a method provided by the present disclosure.
Figure 2:
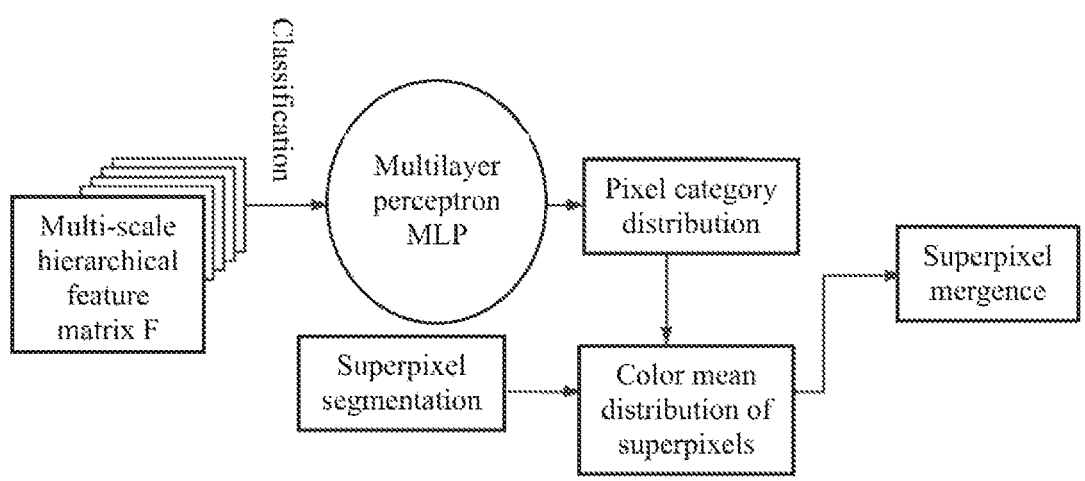
FIG. 2 is a schematic view showing an image recognition process of the method provided by the present disclosure.
Figure 3:
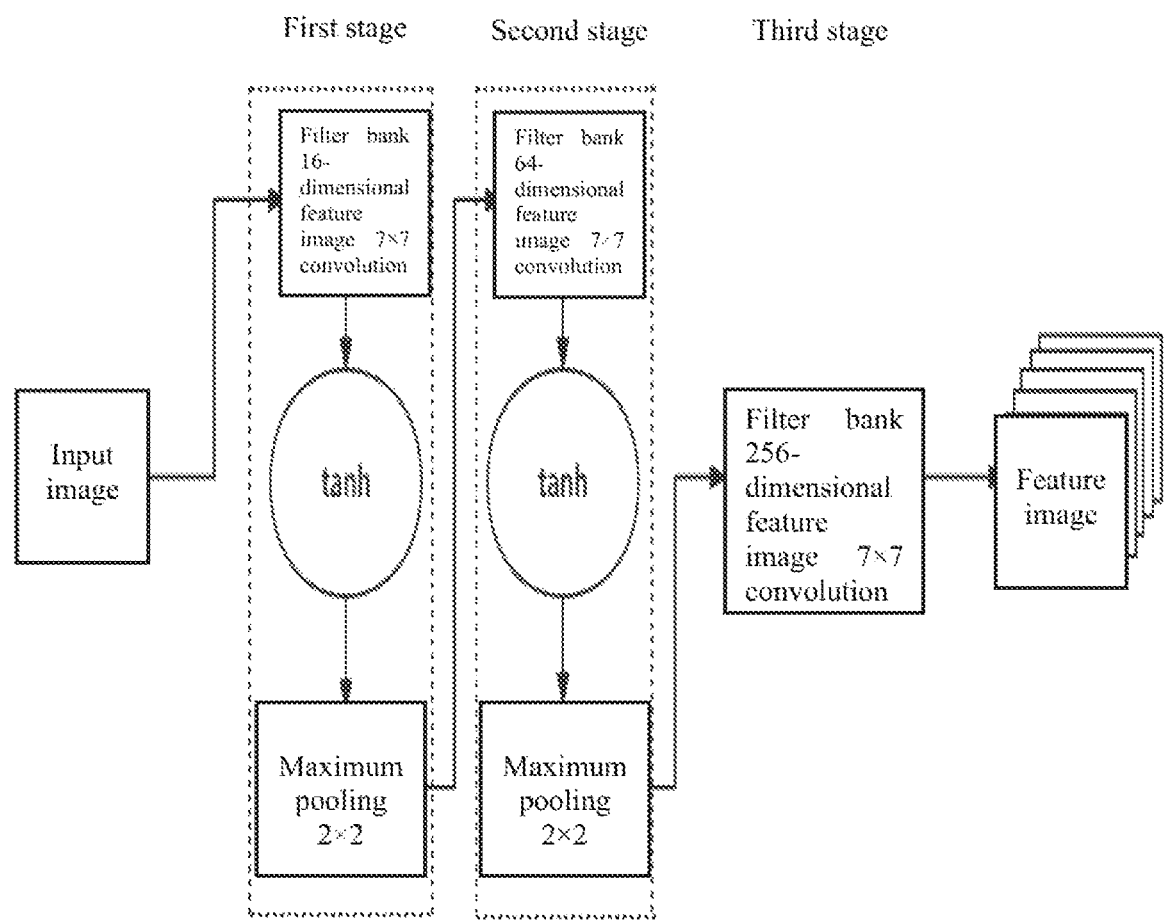
FIG. 3 is a schematic view showing a convolutional neural network in the method provided by the present disclosure.

As shown in FIG. 1 to FIG. 3, disclosed is an image segmentation method combined with superpixel and multi-scale hierarchical feature recognition, including:

step 1, a to-be-segmented image is input into a preconstructed multi-scale Gaussian pyramid to perform extracted multi-scale hierarchical feature recognition to Obtain a plurality of multi-scale images;

step 2, the plurality of multi-scale images are input into a pretrained multi-scale convolutional neural network to generate, feature images;

step 3, the feature images are sampled, the images with same scales are combined together to generate a multi-scale hierarchical feature matrix;

step 4, the multi-scale hierarchical feature matrix implements image pixel category distribution on the to-be-segmented image by virtue of a multilayer perceptron; and step 5, the to-be-segmented image subjected to the image pixel category distribution is segmented by adopting superpixel improved in combination with LBP texture features, and the to-be-segmented image is merged according to a mean value of a color to achieve recognition and segmentation of targets in the image.

The above-mentioned method is described in detail:

A construction method for the multi-scale Gaussian pyramid includes:

A data set VOC2012 is acquired as a training sample and a test sample;

after Gaussian convolution is performed on a first layer of a first group of an original image, taking the first layer as a second layer of a first group of pyramid, wherein a two-dimensional Gaussian convolution function corresponding to a pixel position (x, y) on the image is expressed as:

$$G(x, y, \sigma) = \frac{1}{2\pi\sigma^2} e^{-\frac{(x-\frac{m}{2})^2+(y-\frac{n}{2})^2}{2\sigma^2}}$$

wherein σ is a scale space factor, the larger the value of σ is, the smoother the image is; m and n are dimensions of a Gaussian matrix; and M and N are dimensions of a two-dimensional image;

setting a scale space L(x, y, σ) of the image to be a convolution of a variable-scale Gaussian function G(x, y, σ) and an original image I(x, y), $$L(x, y, \sigma) = G(x, y, \sigma) * I(x, y);$$

then, obtaining an image of a $L_{th}$ layer of each group, wherein the area of the image of each group is 1/2 of the area of an image of a previous group; and repeatedly performing the operation to obtain O*L images in total comprising O groups in total with each group having L layers, thereby constructing a multi-scale Gaussian pyramid SIFT, In step 1, before being input into the multi-scale Gaussian pyramid SIFT, the original image needs to be converted into a YUV color space, and then, the multi scale Gaussian pyramid SIFT is constructed.

In step 2, as shown in FIG. 3, the multi-scale convolutional neural network comprises three same CNN structural networks, each of the CNN structural network consists of three stages, each of a first stage and a second stage consists of a filter bank, a nonlinear activation function tanh and a pooling operation, and a third stage consists of a filter bank.

The filter bank at the first stage comprises 16 convolution kernels, wherein 8 of the convolution kernels are connected to a channel Y for inputting the image, other 8 convolution kernels are connected to channels U and V, and the original image is converted into 16-dimensional feature images; the filter bank at the second stage is connected to the maximum pooling operation result at the first stage, wherein the filter bank comprises 64 convolution kernels, each convolution kernel is connected to any 8 feature images, and the 16-dimensional feature images at the previous stage are converted into 64-dimensional feature images: and the filter bank at the third stage is connected to the maximum pooling operation result at the second stage, wherein the filter bank comprises 256 convolution kernels, each convolution kernel is connected to any 32 feature images, and the 64-dimensional feature images at the previous stage are converted into 256-dimensional feature images.

The size of each convolution kernel of each filter bank is 7×7, and the pooling operation is performed by adopting a 2×2 maximum pooling method.

Data in each image adjacent region in the multi-scale pyramid is subjected to zero mean and normalization processing. The multi-scale convolutional neural network is set as $f_n$ and an internal parameter thereof is set as $\theta_n$, the multi-scale convolutional neural network consists of a convolutional neural network model of each image with a corresponding scale, a parameter of each model is $\theta_n$, i.e., $\theta_n, n \in \{1,2,\ldots,N\}$, wherein $\theta_0$ is an initial parameter of the model, in the existance of a convolutional neural network model with a scale n, for the multi-scale convolutional neural network $f_n$ having S stages, $$f_n(x_n; \theta_n) = W_S H_{S-1};$$

wherein $W_S$ is a weight matrix of a $S_{th}$ stage, $H_{S-1}$ is an output of S−$1_{th}$ stage, and $H_0 = X_n$.

Finally, upsampling the output feature images of the multi-scale convolutional neural network, and combining the images with same scales together to generate a N-scale hierarchical feature matrix F:

$$F = [f_1, \mu(f_2), \ldots, \mu(f_N)],$$

wherein μ is an upsampling function.

The image pixel category distribution comprises:

adding a linear classifier into a multi-scale convolutional neural network model to learn multi-scale hierarchical features, thereby generating a correct classification prediction for each pixel target in the image;

setting $J_i$ as a standardized prediction vector for a category to which a pixel i belongs; and in order to calculate a loss function, utilizing a softmax function to calculate a standardized prediction probability distribution $\widehat{f_{i,a}}$ that the pixel belongs to a category a, $$\widehat{f_{i,a}} = \frac{e^{w_a^T F_i}}{\sum_{b \in classes} e^{w_b^T F_i}}$$

wherein W is a temporary weight matrix only for learning features, and $F_i$ represents a multi-scale hierarchical feature expression vector corresponding to a position where the pixel i is located.

The superpixel segmentation adopts an improvement method based on LBP texture features, and this method is specifically implemented as follows:

initializing seed points, uniformly distributing the seed points in the image according to a set number of the superpixel, setting the image to have N pixel points in total, presegmenting the pixel points into K superpixel with the same sizes, with each superpixel having a size N/K and a distance between the adjacent seed points, i.e., a step length being $S = \sqrt{N/K}$, calculating a center of the seed points according to $$C_k = [l_k, a_k, b_k, x_k, y_k]^T;$$

measuring a distance, distributing a category label for each pixel point within a neighborhood surrounding each seed point, performing search within a range 25×25 by adopting a Euclidean distance measurement method, and then, calculating a distance D between each seed point in a clustering center and each pixel point within the range 25×25 according to:

$$d_{lab} = \sqrt{(l_k - l_i)^2 + (a_k - a_i)^2 + (b_k - b_i)^2}$$
$$d_{xy} = \sqrt{(x_k - x_i)^2 + (y_k - y_i)^2}$$
$$D = d_{lab} + \frac{m}{S} d_{xy};$$

wherein $d_{lab}$ is a color distance, $d_{xy}$ is a spatial distance, m is a weight coefficient for adjusting the spatial distance, S is a distance among the seed points, and therefore, the smaller the value of D is, the higher the similarity among the pixels is;

further performing iterative optimization, and updating the center of the seed points until errors are converged: and enhancing connectivity, and distributing the superpixel according to a "Z"-shaped tendency.

The superpixel segmentation method further comprises: comparing gray values of pixel points in the neighborhood thereof with a threshold by adopting a LBP algorithm to obtain binary codes for expressing local texture features, wherein a LBP value is calculated according to a formula:

$$LBP_{i_c} = \sum_{p=0}^{p-1} 2^p s(i_p - i_c)$$

wherein $i_c$ is a gray value of a pixel point in the center, $l_p$ is a gray value of each pixel point in the neighborhood, and s is a sign function, $$S(x) = \begin{cases} 1, x \geq 0 \\ 0, x < 0 \end{cases}$$

introducing the LBP texture features to an SLIC algorithm, adding the LBP value when the seed points are initialized by using an improved SLIC algorithm, i.e., $$C_k = [l_k, a_k, b_k, x_k, y_k, LBP_k]^T$$

adding a texture distance in the step of measuring the distance, i.e., $$d_{LBP} = \sqrt{(LBP_k - LBP_i)^2}$$

$$D = d_{lab} + \frac{m}{S} d_{xy} + \frac{n}{S} d_{LBP}$$

wherein n is a weight coefficient for adjusting the texture distance; and finally, merging regions where color features are similar to achieve segmentation of the image.

What is claimed is:

1. An image segmentation method combined with superpixel and multi-scale hierarchical feature recognition, comprising:
    inputting a to-be-segmented image into a preconstructed multi-scale Gaussian pyramid to perform extracted multi-scale hierarchical feature recognition to obtain a plurality of multi-scale images;
    inputting the plurality of multi-scale images into a pretrained multi-scale convolutional neural network to generate feature images, sampling the feature images, and combining the images with same scales together to generate a multi-scale hierarchical feature matrix;
    implementing, by the multi-scale hierarchical feature matrix, image pixel category distribution on the to-be-segmented image of the multi-scale hierarchical feature matrix by virtue of a multilayer perceptron; and
    segmenting, by adopting superpixel improved in combination with LBP texture features, the to-be-segmented image subjected to the image pixel category distribution, and merging the to-be-segmented image according to a mean value of a color to achieve recognition and segmentation of targets in the image.

2. The image segmentation method combined with superpixel and multi-scale hierarchical feature recognition of claim 1, wherein a construction method for the multi-scale Gaussian pyramid comprises:
    after Gaussian convolution is performed on a first layer of a first group of an original image, taking the first layer as a second layer of a first group of pyramid, wherein a two-dimensional Gaussian convolution function corresponding to a pixel position (x, y) on the image is expressed as:

$$G(x, y, \sigma) = \frac{1}{2\pi\sigma^2} e^{-\frac{(x-\frac{m}{2})^2 + (y-\frac{n}{2})^2}{2\sigma^2}}$$

wherein $\sigma$ is a scale space factor, the larger the value of $\sigma$ is, the smoother the image is; m and n are dimensions of a Gaussian matrix; and M and N are dimensions of a two-dimensional image;

setting a scale space L(x, y, $\sigma$) of the image to be a convolution of a variable-scale Gaussian function G(x, y, $\sigma$) and an original image I(x, y), L(x, y, $\sigma$)=G(x, y, $\sigma$)*I(x, y);

then, obtaining an image of a $L_{th}$ layer of each group, wherein the area of the image of each group is 1/2 of the area of an image of a previous group; and repeatedly performing the operation to obtain O*L images in total comprising O groups in total with each group having L layers, thereby constructing a multi-scale Gaussian pyramid SIFT.

3. The image segmentation method combined with superpixel and multi-scale hierarchical feature recognition of claim 1, wherein the multi-scale convolutional neural network comprises three same CNN structural networks, each of the CNN structural network consists of three stages, each of a first stage and a second stage consists of a filter bank, a nonlinear activation function tanh and a pooling operation, and a third stage consists of a filter bank.

4. The image segmentation method combined with superpixel and multi-scale hierarchical feature recognition of claim 3, wherein the filter bank at the first stage comprises 16 convolution kernels, wherein 8 of the convolution kernels are connected to a channel Y for inputting the image, other 8 convolution kernels are connected to channels U and V, and the original image is converted into 16-dimensional feature images; the filter bank at the second stage is connected to the maximum pooling operation result at the first stage, wherein the filter bank comprises 64 convolution kernels, each convolution kernel is connected to any 8 feature images, and the 16-dimensional feature images at the previous stage are converted into 64-dimensional feature images; and the filter bank at the third stage is connected to the maximum pooling operation result at the second stage, wherein the filter bank comprises 256 convolution kernels, each convolution kernel is connected to any 32 feature images, and the 64-dimensional feature images at the previous stage are converted into 256-dimensional feature images.

5. The image segmentation method combined with superpixel and multi-scale hierarchical feature recognition of claim 4, wherein the size of each convolution kernel of each filter bank is 7×7, and the pooling operation is performed by adopting a 2×2 maximum pooling method.

6. The image segmentation method combined with superpixel and multi-scale hierarchical feature recognition of claim 3, wherein the multi-scale convolutional neural network is set as $f_n$ and an internal parameter thereof is set as $\theta_n$, the multi-scale convolutional neural network consists of a convolutional neural network model of each image with a corresponding scale, a parameter of each model is $\theta_n$, i.e., $\theta_n = \theta_0$, $n \in \{1, 2, \ldots, N\}$, wherein $\theta_0$ is an initial parameter of the model, in the existance of a convolutional neural network model with a scale n, for the multi-scale convolutional neural network $f_n$ having S stages, $$f_m(X_n; \theta_n) = W_S H_{S-1}$$

wherein $W_S$ a weight matrix of a $S_{th}$ stage, $H_{S-1}$ is an output of a $S-1_{th}$ stage, and $H_0 = X_n$.

7. The image segmentation method combined with superpixel and multi-scale hierarchical feature recognition of claim 6, wherein the multi-scale hierarchical feature matrix satisfies a formula:

$$F=[f_1, \mu(f_2), \ldots, \mu(f_N)],$$

wherein μ is an upsampling function.

8. The image segmentation method combined with superpixel and multi-scale hierarchical feature recognition of claim 1, wherein the image pixel category distribution comprises:
adding a linear classifier into a multi-scale convolutional neural network model to learn multi-scale hierarchical features, thereby generating a correct classification prediction for each pixel target in the image;
setting $J_i$ as a standardized prediction vector for a category to which a pixel i belongs; and in order to calculate a loss function, utilizing a softmax function to calculate a standardized prediction probability distribution $\hat{f}_{i,a}$ that the pixel i belongs to a category a, $$\hat{f}_{i,a} = \frac{e^{w_a^T F_i}}{\sum_{b \in classes} e^{w_b^T F_i}}$$

wherein w is a temporary weight matrix only for learning features, and $F_i$ represents a multi-scale hierarchical feature expression vector corresponding to a position where the pixel i is located.

9. The image segmentation method combined with superpixel and multi-scale hierarchical feature recognition of claim 1, wherein the superpixel segmentation adopts an improvement method based on LBP texture features, and this method is specifically implemented as follows:
initializing seed points, uniformly distributing the seed points in the image according to a set number of the superpixel, setting the image to have N pixel points in total, presegmenting the pixel points into K superpixel with the same sizes, with each superpixel having a size N/K and a distance between the adjacent seed points, i.e., a step length being $S=\sqrt{N/K}$, calculating a center of the seed points according to $$C_k=[l_k, a_k, b_k, x_k, y_k]^T;$$

measuring a distance, distributing a category label for each pixel point within a neighborhood surrounding each seed point, performing search within a range 25×25 by adopting an Euclidean distance measurement method, and then, calculating a distance D between each seed point in a clustering center and each pixel point within the range 25×25 according to:

$$d_{lab} = \sqrt{(l_k - l_i)^2 + (a_k - a_i)^2 + (b_k - b_i)^2}$$

-continued $$d_{xy} = \sqrt{(x_k - x_i)^2 + (y_k - y_i)^2}$$

$$D = d_{lab} + \frac{m}{S} d_{xy};$$

wherein $d_{lab}$ is a color distance, $d_{xy}$ is a spatial distance, m is a weight coefficient for adjusting the spatial distance, S is a distance among the seed points, and therefore, the smaller the value of D is, the higher the similarity among the pixels is;
further performing iterative optimization, and updating the center of the seed points until errors are converged; and
enhancing connectivity, and distributing the superpixel according to a "Z"-shaped tendency.

10. The image segmentation method combined with superpixel and multi-scale hierarchical feature recognition of claim 9, wherein the superpixel segmentation method further comprises:
comparing gray values of pixel points in the neighborhood thereof with a threshold by adopting a LBP algorithm to obtain binary codes for expressing local texture features, wherein a LBP value is calculated according to a formula:

$$LBP_{i_c} = \sum_{p=0}^{p-1} 2^p s(i_p - i_c)$$

wherein is a gray value of a pixel point in the center, $i_p$ is a gray value of each pixel point in the neighborhood, and s is a sign function, $$S(x) = \begin{cases} 1, x \geq 0 \\ 0, x < 0 \end{cases}$$

introducing the LBP texture features to an SLIC algorithm, adding the LBP value when the seed points are initialized by using an improved SLIC algorithm, i.e., $$C_k=[l_k, a_k, b_k, x_k, y_k, KBP_k]^T$$

adding a texture distance in the step of measuring the distance, i.e., $$d_{LBP} = \sqrt{(LBP_k - LBP_i)^2}$$

$$D = d_{lab} + \frac{m}{S} d_{xy} + \frac{n}{S} d_{LBP}$$

wherein n is a weight coefficient for adjusting the texture distance; and finally, merging regions where color features are similar to achieve segmentation of the image.

* * * * *